United States Patent
Tsunekawa

[11] Patent Number: 5,948,515
[45] Date of Patent: Sep. 7, 1999

[54] SILICONE RUBBER COMPOSITE

[75] Inventor: Takeyuki Tsunekawa, Nagahama, Japan

[73] Assignee: Mitsubishi Plastics, Inc., Tokyo, Japan

[21] Appl. No.: 08/976,660

[22] Filed: Nov. 24, 1997

[30] Foreign Application Priority Data

Jun. 30, 1997 [JP] Japan ................................ 9-174273

[51] Int. Cl.$^6$ ................................ B32B 7/02; B32B 25/20
[52] U.S. Cl. ..................... 428/215; 428/214; 428/334; 428/413; 428/423.7; 428/448; 428/451; 428/910
[58] Field of Search ..................... 428/213, 214, 428/334, 413, 423.7, 448, 451, 215, 910

[56] References Cited

U.S. PATENT DOCUMENTS

| | | | |
|---|---|---|---|
| 2,976,185 | 3/1961 | McBride | 428/447 |
| 4,938,827 | 7/1990 | Leach et al. | 156/272.6 |
| 5,085,894 | 2/1992 | Pascucci et al. | 427/387 |

FOREIGN PATENT DOCUMENTS 776 928  6/1997  European Pat. Off. .

OTHER PUBLICATIONS

Patent Abstracts of Japan, Abstract of JP 08–143834, vol. 096, No. 010, Oct. 31, 1996.

*Primary Examiner*—D. S. Nakarani
*Attorney, Agent, or Firm*—Oblon, Spivak, McClelland, Maier & Neustadt, P.C.

[57] ABSTRACT

A silicone rubber composite comprising a sheet or film made essentially of a crystalline polyester resin, and, formed sequentially on at least one side of the sheet or film, an undercoating layer (A) made substantially of an amorphous polymer and a thin film layer (B) having good affinity for the undercoating layer and containing a silicone resin, wherein a silicone rubber layer (C) made of a silicone elastomer resin cured to have a hardness within a range of from 20 to 70 (JIS K6301 spring type hardness test A) is formed on the thin film layer (B), so that the sheet or film and the silicone ruber layer (C) are integrated.

7 Claims, No Drawings

SILICONE RUBBER COMPOSITE

The present invention relates to a silicone rubber composite excellent in elasticity, smoothness, soft touch, etc., which is useful as a sealing material to be incorporated into electric or electronic parts, as a surface material of a touch panel for e.g. display related products, or as various antislipping materials (hereinafter referred to generally as "a sealing material or the like").

Heretofore, silicone rubber has been used for the above-mentioned application as a sealing material or the like, since it is excellent in heat resistance and electrical properties.

However, if a material made of such a silicone rubber itself and having a relatively thin wall thickness is used for an application as a sealing material or the like by itself, it undergoes deformation, as it is a rubber product, whereby there has been a practical problem such that the incorporated dimensional precision tends to be poor, creasing is likely to form, or the formed products tend to adhere to one another.

To solve such a problem, it has been studied to integrate a simple substance of silicone rubber and a plastic sheet or film. As a method for integration, there may be mentioned a method wherein a preliminarily crosslinked silicone rubber simple substance and a plastic sheet or film are integrated by means of an adhesive, or a method wherein they are integrated by means of an adhesive layer formed by a pressure sensitive adhesive double coated tape or by coating of an adhesive agent. In such a case, a usual adhesive for silicone rubber may be used. However, it is necessary to separately coat the adhesive, thus leading to a disadvantage such that the processing cost tends to be high, or an elongated composite tends to be hardly obtainable.

To overcome such a disadvantage, it has been studied to coat a silicone type primer on a plastic sheet or film and bond a non-crosslinked silicone rubber thereto, followed by thermal crosslinking to integrate the silicone rubber thereto. However, when the plastic sheet or film is made essentially of a crystalline polyester resin, the adhesion between the silicone type primer and the plastic sheet or film tends to be poor, whereby the resulting composite tends to have a problem of peeling or the like.

Further, when the plastic sheet or film has poor heat resistance, this method can not be applied, since heat is exerted during the crosslinking of silicone rubber. Further, there has been a problem that the difference in the thermal expansion is substantial between the plastic sheet or film and the silicone rubber, so that curling is likely to result in the resulting composite.

The present invention is based on a discovery of a silicone rubber composite which is capable of solving the above-mentioned problems.

The present invention provides a silicone rubber composite comprising a sheet or film made essentially of a crystalline polyester resin, and, formed sequentially on at least one side of the sheet or film, an undercoating layer (A) made substantially of an amorphous polymer and a thin film layer (B) having good affinity for the undercoating layer and containing a silicone resin, wherein a silicone rubber layer (C) made of a silicone elastomer resin cured to have a hardness within a range of from 20 to 70 (JIS K6301 spring type hardness test A) is formed on the thin film layer (B), so that the sheet or film and the silicone ruber layer (C) are integrated.

Now, the present invention will be described in detail with reference to the preferred embodiments.

In the silicone rubber composite of the present invention, a silicone rubber having a specific hardness and a sheet or film made essentially of a crystalline affinity for the undercoating layer (A), on at least one side of the plastic sheet or film made of the above material. The undercoating layer (A) is formed of a material made substantially of an amorphous polymer. The amorphous polymer is not particularly limited so long as it is capable of being uniformly coated on the above plastic sheet or film, and it may suitably be selected from substantially no crystalline polymers such as a polyurethane resin, an acrylic resin and an amorphous polyester resin. Specific examples include a polyurethane resin having a polyester resin and/or polyether resin linearly extended by e.g. urethane bonds, an acrylic resin composed of a copolymer of an acrylate and/or methacrylate, and a copolymer polyester resin wherein the acid component or the glycol component comprises at least two monomers. Such an amorphous resin is coated to form a thin film. Accordingly, it is used usually in the state diluted with an organic solvent or in the form emulsified or solubilized in water and diluted to a proper concentration.

The undercoating layer (A) may be one having a crosslinked structure for the purpose of improving the heat resistance and solvent resistance. In such a case, the above amorphous polymer is one having crosslinkable functional groups such as carboxyl groups, hydroxyl groups or amino groups on its main or side chain, and a crosslinking agent may suitably be selected from a polyester resin are laminated, whereby a defective product due to creasing or bending is less likely, as compared with the single substance of silicone rubber, whereby the processability or the operation efficiency for incorporation will be substantially improved, and the yield will be improved.

Further, the adhesion between the two layers can be improved by forming a certain specific undercoating layer and a silicone resin-containing thermosetting thin film between the above two layers.

Polyethylene terephthalate or polyethylene naphthalate may, for example, be mentioned as the material for the sheet or film made essentially of a crystalline polyester resin to be used in the present invention, and the sheet or film is preferably a sheet or film stretched at least monoaxially, from the viewpoint of the mechanical strength or the like of the sheet or film.

The plastic sheet or film made of the above material preferably has a thickness within a range of from 10 to 350 $\mu$m. If it is less than 10 $\mu$m, creasing is likely to form during formation of another layer on the surface. If it exceeds 350 $\mu$m, the sheet or film tends to be too hard, whereby coating operation tends to be difficult.

In the present invention, it is necessary to form, via an undercoating layer (A), a thermosetting thin film layer (B) containing a silicone resin having good polyisocyanate, melamine, a polyfunctional epoxy resin, a metal compound, etc. In addition to the above crosslinking agent, a leveling agent made of a surfactant, an anti-blocking agent such as silica, or a thickener, may also be incorporated to the coating fluid.

The thickness of the undercoating layer (A) is preferably within a range of from 0.01 to 5.0 $\mu$m. If the thickness is less than 0.01 $\mu$m, there will be a drawback such that it tends to be difficult to adjust the thickness of the coating, or the adhesion to the thermosetting thin film layer (B) containing a silicone resin tends to be poor. On the other hand, if the thickness exceeds 5.0 $\mu$m, the operation for coating the undercoating layer tends to be difficult.

Such a coating fluid is coated on at least one side of a plastic sheet or film made essentially of the above-mentioned crystalline polyester resin, then dried and further subjected to thermal crosslinking as the case requires, to form an undercoating layer (A). As the coating method, a conventional coating method suitable for the coating fluid may be employed. The coating fluid may be coated on a plastic sheet or film formed by a separate step, or the coating fluid may be coated directly on a non-stretched plastic sheet or film, followed by stretching to form an undercoating layer (A). Further, surface treatment such as corona treatment may be applied preliminarily to the surface to be coated, for the purpose of improving the leveling property or adhesion of the coating fluid.

In the present invention, a thermosetting thin film layer (B) containing a silicone resin is further formed on the undercoating layer (A). The thermosetting resin containing a silicone resin to be used, may be one which is composed mainly of a silicone resin and which has good affinity for the undercoating layer (A) and is capable of forming a crosslinked coating film by heating or ultraviolet irradiation after coating, or one capable of forming a crosslinked coating film simultaneously during crosslinking of the silicone elastomer.

Examples of the silicone resin useful for this purpose include an addition-type silicone resin, a condensation type silicone resin and an UV curable silicone resin. The addition type silicone resin may be one obtained by using, as a base polymer, a polydimethylsiloxane containing vinyl groups, and incorporating a polymethylhydrogensiloxane as a crosslinking agent thereto, followed by reacting and curing in the presence of a platinum catalyst. The condensation silicone resin may be one obtained by using as a base polymer a polydimethylsiloxane containing silanol groups at the terminals, and incorporating a polymethyl hydrogensiloxane as a crosslinking agent thereto, followed by heating and curing in the presence of an organic tin catalyst.

Further, the UV curable silicone resin may be one obtained by incorporating a photopolymerization initiator to a base polymer such as a polydimethylsiloxane containing acryloyl groups or methacryloyl groups, a polydimethylsiloxane containing a mercapto group and a vinyl group, the above-mentioned addition type silicone resin-blend, or a polydimethylsiloxane containing epoxy groups curable by a cation curing mechanism, and curing the mixture by irradiation with UV rays. A solvent may be suitably added to the silicone resin blend to obtain a coating fluid of (B).

Further, the coating fluid preferably contains an additive such as a silane coupling agent for the purpose of improving the affinity for the undercoating layer (A). The silane coupling agent for this purpose may be a compound of the formula $YRSiX_3$, wherein Y is an organic functional group such as a vinyl group, an epoxy group, an amino group or a mercapto group, R is an alkylene group such as methylene, ethylene or propylene, and X is a hydrolyzable functional group such as a methoxy group or an ethoxy group, or an alkyl group. Specific compounds include, for example, vinyl triethoxysilane, vinyl trimethoxysilane, γ-glycidylpropyltrimethoxysilane, γ-glycidylpropyltriethoxysilane, N-β(aminoethyl)-γ-aminopropyltrimethoxysilane, N-β(aminoethyl)-γ-aminopropylmethyldimethoxysilane, and γ-mercaptopropyltrimethoxysilane.

The thickness of coating of the above coating fluid is preferably from 0.01 to 1.0 μm after drying the solvent. If the thickness of coating is less than 0.01 μm, a problem is likely to result such that a cured film having a uniform thickness is hardly obtainable, or the adhesion to the silicone elastomer layer tends to be inadequate. With the silicone resin of the above composition, the film strength is usually not so strong. Therefore, if its film thickness exceeds 1.0 μm, cohesion failure is likely to occur at the silicone resin layer when the peel strength of the composite is evaluated, whereby no adequate strength as a composite tends to be obtainable.

The coating method is not particularly limited so long as a thin film can be obtained with high precision, like the undercoating layer (A), and a conventional coating method may be employed.

The composite of the present invention is one having a silicone rubber layer (C) made of a silicone elastomer resin formed on the above-mentioned thermosetting thin film layer (B) containing a silicone resin. As the silicone elastomer resin, one made essentially of a polydimethylsiloxane containing vinyl groups, is common, but it may be one having some of methyl groups substituted by phenyl groups or trifluoropropyl groups. The content of vinyl groups is preferably within a range of from 0.05 to 1.0 mol %.

Further, the silicone elastomer resin may contain a reinforcing filler such as fumed silica, precipitated silica, diatomaceous earth or silica powder, various processing adjuvants and heat resistance-improving agents, as well as various additives capable of imparting functions as an elastomer. As such functional additives, a flame retardancy-imparting agent, a heat-releasing filler, and an electrically conductive filler may, for example, be mentioned.

The above silicone elastomer resin is required to be cured to have a hardness within a certain specific range. Namely, the hardness is within a range of from 20 to 70 (the measuring method is in accordance with JIS K6301 spring type hardness test A). If the hardness is less than 20, the composite tends to be so soft that handling tends to be difficult. On the other hand, if it exceeds 70, the composite tends to be so hard that there will be a problem that the composite tends to be poor in elasticity.

The silicone rubber layer (C) made of the above silicone elastomer resin may be formed by the following method. Firstly, in a non-crosslinked state, it is formed as a laminate on the thermosetting thin film layer (B) containing a silicone resin. As the forming method, the above non-crosslinked silicone elastomer resin may be formed into a sheet by extrusion molding, injection molding, calender molding or press molding, followed by lamination on the layer (B), or it may be formed directly on the layer (B) by a conventional coating method.

The thickness of the silicone rubber layer (C) is required to be at least 50 μm. If the thickness is less than this, the elastic property as a composite tends to be poor and tends to depart from the object of the present invention. The maximum thickness of this layer is preferably about 1.5 mm from the viewpoint of the application and costs. A non-crosslinked silicone elastomer laminate thus obtained is then crosslinked by radiation to obtain the composite of the present invention. As the radiation, γ-rays, electron rays or X-rays may, for example, be preferably used. The irradiation dose is usually preferably from 20 to 150 kGy, although it depends on the type of the radiation source.

Further, to select this irradiation dose, it is necessary to take into account not only the crosslinked density of the silicone rubber but also the radiation-resistance of the plastic film used as the substrate. From this viewpoint, the crystalline polyester resin to be used in the present invention is usually excellent in the resistance against radiation and thus is a substrate extremely suitable for the purpose of the present invention.

As the structure of the composite of the present invention, a double layer structure having the silicone rubber layer formed on one side of the plastic sheet or film, or a three layered structure having a silicone rubber layer disposed inbetween a pair of plastic sheets or films, may be used.

Now, the present invention will be described in further detail with reference to Examples. However, it should be understood that the present invention is by no means restricted to such specific Examples.

EXAMPLE NO. 1 TO NO. 6

A biaxially stretched polyethylene terephthalate film (PET S-100, manufactured by Diafoil Hoechst K.K.) having corona treatment applied and having a thickness of 50 µm, was used, and an undercoating layer (A), a thin layer (B) containing a silicone resin and a silicone rubber layer (C) were sequentially formed thereon by the following methods, to obtain silicone composites having various thickness constructions. With respect to these composites, the initial interlaminar adhesion and the interlaminar adhesion after aging at 60° C. under a relative humidity of 95% for 7 days, were evaluated, and the results are shown in Table 1.

The method for evaluating the interlaminar adhesion was such that the silicone rubber layer was manually peeled, and evaluation was made by evaluation standards such that symbol ○ indicates that the interlaminar adhesion was excellent, symbol Δ indicates that slight peeling occurred at a portion other than the silicone rubber layer, but such peeling was not practically problematic, and symbol× indicates that peeling occurred at a portion other than the rubber portion to a practically problematic level. Here, one where there was no interlaminar adhesion, was designated as "not bonded".

Undercoating Layer (A)

15 Parts by weight of an amorphous polyester resin (Viron 240, tradename, manufactured by Toyo Boseki K.K.) and 2 parts by weight of a polyisocyanate (Coronate L, tradename, manufactured by Nippon Polyurethane K.K.) were diluted by 85 parts by weight of a solvent (MEK/toluene=1/4 (weight ratio)) to obtain a coating fluid. This coating fluid was coated on the above PET film by a bar coater so that the film thickness after drying would be 1.0 µm, followed by drying the solvent and crosslinking at 100° C. for 10 minutes in a Geer's oven.

Thin Layer (B) Containing a Silicone Resin

20 Parts by weight of a condensation type silicone resin composition (SRX290, tradename, manufactured by Toray·Dow Corning Silicone K.K.) and 1.2 parts by weight of a curing agent (SRX242C, tradename, manufactured by Toray·Dow Corning Silicone K.K.) were diluted by 79.8 parts by weight of a solvent (toluene) to obtain a coating fluid. This coating fluid was coated on the undercoating layer (A) by a bar coater so that a predetermined thickness after drying would be obtained, and drying and curing were carried out in a Geer's oven at 100° C. for 10 minutes.

Silicone Rubber Layer (C)

A millable type silicone compound (KE-540U, manufactured by Shin-Etsu Chemical Co., Ltd.) was molded by a press molding method into non-crosslinked sheets having various thicknesses. Each sheet was laminated to contact the layer (B) and pressed at room temperature under pressure of 50 kg/cm$^2$ to obtain a composite. To the silicone elastomer side of this composite, electron rays of 100 kGy were irradiated by an electron ray irradiation apparatus under an accelerated voltage of 200 KV to obtain a silicone composite having a silicone rubber layer (C) having a hardness of 40 (JIS K6301 A) formed.

EXAMPLE NO. 7

A composite was prepared in the same manner as in Example No. 1 except that no undercoating layer (A) was formed, and evaluation was carried out in the same manner.

EXAMPLE NO. 8

A composite was prepared in the same manner as in Example No. 1 except that no thin layer (B) containing a silicone resin was formed, and evaluation was carried out in the same manner.

TABLE 1

|  | No. 1 | No. 2 | No. 3 | No. 4 | No. 5 | No. 6 | No. 7 | No. 8 |
|---|---|---|---|---|---|---|---|---|
| Thickness of the undercoating layer (A) (µm) | 1.0 | 1.0 | 1.0 | 1.0 | 1.0 | 1.0 | Corona treatment | 1.0 |
| Thickness of the silicone resin-containing thin film layer (B) (µm) | 0.02 | 0.10 | 0.50 | 1.00 | 0.005 | 10.0 | 0.50 | Nil |
| Thickness of the silicone rubber layer (C) (µm) | 100 | 100 | 200 | 500 | 100 | 100 | 200 | 200 |
| Evaluation of the initial adhesion | ○ | ○ | ○ | ○ | Δ | Δ | ○ | Not bonded |
| Evaluation of the adhesion after aging | ○ | ○ | ○ | ○ | Δ | Δ | x | — |

EXAMPLE NO. 9

In the same manner as in Example No. 1, a thin film layer (B) and a silicone rubber layer (C) were sequentially formed on an easily adhesive polyester terephthalate film (T100E, tradename, manufactured by Diafoil Hoechst K.K.) having a thickness of 100 µm and having a polyurethane type amorphous polymer layer (A) preliminarily laminated, to obtain a silicone composite. With respect to this composite, evaluation was carried out in the same manner as in Example No. 1, and the results are shown in Table 2.

EXAMPLE NO. 10

A composite was prepared in the same manner as in Example No. 9 except that no thin film layer (B) containing a silicone resin was formed, and evaluation was carried out in the same manner.

EXAMPLE NO. 11

A composite was prepared in the same manner as in Example No. 9 except that a silicone rubber layer (C) was formed by the following method in place of the silicone elastomer resin, and evaluation was carried out in the same manner.

Silicone Rubber Layer (C)

An addition type liquid rubber composition (KE-1950-50A/B), manufactured by Shin-Etsu Chemical Co., Ltd.) was coated by an applicator on a silicone type curable resin layer to obtain a non-crosslinked sheet. This sheet was thermally crosslinked at 140° C. for 15 minutes to obtain a silicone composite in which the hardness of the silicone rubber layer was 50 (JIS K6301 A).

EXAMPLE NO. 12

A composite was prepared in the same manner as in Example No. 11 except that no thin film layer (B) containing a silicone resin was formed, and evaluation was carried out in the same manner.

TABLE 2

|  | No. 9 | No. 10 | No. 11 | No. 12 |
|---|---|---|---|---|
| Thickness of the silicone resin-containing thin film layer (B) ($\mu$m) | 0.50 | — | 0.50 | — |
| Thickness of the silicone rubber layer (C) ($\mu$m) | 200 | 200 | 200 | 200 |
| Evaluation of the initial adhesion | ○ | Not bonded | Not bonded | ○ |
| Evaluation of the adhesion after aging | ○ | — | — | X |

As described in the foregoing, the silicone rubber composite of the present invention is one firmly bonded to a sheet or film made essentially of a crystalline polyester resin and is thus a composite capable of being easily incorporated to electric or electronic parts while utilizing the excellent reliability in e.g. the physical properties and electrical properties of the silicone rubber, and it is suitable for use as a sealing material, a surface material of a touch panel for display-related products, or as various antislipping materials.

Further, the silicone rubber composite of the present invention has a sheet or film made essentially of a crystalline polyester resin on one side or on both sides, whereby printing processing or secondary processing such as various coating processing is very easy.

I claim:

1. A silicone rubber composite comprising a sheet or film made essentially of a crystalline polyester resin, and, formed sequentially on at least one side of the sheet or film, an undercoating layer (A) made essentially of an amorphous polymer and a thin film layer (B) having good affinity for the undercoating layer and containing a silicone resin, wherein a silicone rubber layer (C) made of a silicone elastomer resin cured to have a hardness within a range of from 20 to 70 (JIS K6301 spring type hardness test A) is formed on the thin film layer (B), so that the sheet or film and the silicone ruber layer (C) are integrated, and wherein the thin film layer (B) containing a silicone resin has a thickness within a range of from 0.01 to 1.0 $\mu$m.

2. The silicone rubber composite according to claim 1, wherein the sheet or film made essentially of a crystalline polyester resin, is one stretched at least monoaxially.

3. The silicone rubber composite according to claim 1, wherein the silicone rubber layer (C) is one cured by radiation.

4. The silicone rubber composite according to claim 1, wherein the silicone rubber layer (C) has a thickness of at least 50 $\mu$m.

5. A silicone rubber composite comprising a sheet or film made essentially of a crystalline polyester resin having a thickness of from 10 to 350 $\mu$m, and, formed sequentially on at least once side of the sheet or film, an undercoating layer (A) having a thickness of from 0.01 to 5.0 $\mu$m made essentially of an amorphous polymer and a thin film layer (B) having a thickness of from 0.01 to 1.0 $\mu$m having good affinity for the undercoating layer and containing a silicone resin, wherein a silicone rubber layer (C) having a thickness of at least 50 $\mu$m made of a silicone elastomer resin cured to have a hardness within a range of from 20 to 70 (JIS K6301 spring type hardness test A) is formed on the thin film layer (B), so that the sheet or film and the silicone ruber layer (C) are integrated.

6. The silicone rubber composite according to claim 5, wherein the sheet or film made essentially of a crystalline polyester resin, is one stretched at least monoaxially.

7. The silicone rubber composite according to claim 5, wherein the silicone rubber layer (C) is one cured by radiation.

* * * * *